United States Patent [19]

Minuhin

[11] Patent Number: 4,823,209
[45] Date of Patent: Apr. 18, 1989

[54] 1,7,2,3 ENCODING/DECODING EMPLOYING 3/2 FREQUENCY DIVISION

[75] Inventor: Vadim B. Minuhin, Bloomington, Minn.

[73] Assignee: Magnetic Peripherals Inc., Minneapolis, Minn.

[21] Appl. No.: 116,989

[22] Filed: Nov. 5, 1987

[51] Int. Cl.$^4$ .............................................. G11B 5/09
[52] U.S. Cl. .......................................... 360/51; 360/40
[58] Field of Search ............ 360/40, 51; 340/347 DD; 375/18, 111

[56] References Cited

U.S. PATENT DOCUMENTS

| | | |
|---|---|---|
| 4,337,458 | 6/1982 | Cohn et al. ........................ 340/347 |
| 4,356,456 | 10/1982 | Uzunoglu .......................... 331/117 |
| 4,503,420 | 3/1985 | Rub et al. ............................ 360/40 |
| 4,672,362 | 6/1987 | Furukawa et al. .................. 360/40 |

Primary Examiner—Vincent P. Canney
Attorney, Agent, or Firm—Robert M. Angus; Joseph A. Genovese

[57] ABSTRACT

An encoding/decoding system for 1,7,2,3 codes employs an oscillator having a frequency f and dividers providing signals at frequencies equal to $\frac{1}{3}$ f and $\frac{2}{3}$ f. A code converter is responsive to the three signals to encode or decode data. A 3/2 frequency divider employs two D-type flip-flops, an OR gate and an AND gate arranged to respond to an input signal at a frequency f to derive an output signal at a frequency $\frac{2}{3}$ f.

5 Claims, 2 Drawing Sheets

1,7,2,3 ENCODING/DECODING EMPLOYING 3/2 FREQUENCY DIVISION

This invention relates to data recording and recovery systems, and particularly to magnetic data storage and retrieval systems.

Run length limited codes have gained significant recognition in magnetic data storage systems due to their ability to increase density of stored data over other forms of code. One such code is the (1,7,2,3) code, which has a minimum of 1 encoded zero between successive encoded ones and a maximum of 7 encoded zeroes between successive encoded ones, and it has a rate of $\frac{2}{3}$, that is, 2 source bits encoded into 3 code bits. The advantage of (1,7,2,3) codes are described by T. Horiguchi and K. Morita, "An Optimization of Modulation Codes in Digital Recording", IEEE Transactions on Magnetics, Vol. MAG-12, pp. 740-742, November, 1976; G. Jacoby and R. Kost, "Binary Two-Thirds Rate Code with Full Word Look-Ahead", IEEE Transactions on Magnetics, Vol. MAG-20, pp. 709-714, September, 1984; P. H. Siegel, "Recording Codes for Digital Magnetic Storage", IEEE Transactions on Magnetics, Vol. MAG-21, pp. 1344-1349, September, 1985. See also Cohn et al, U.S. Pat. No. 4,337,458, issued June 29, 1982. One problem associated with the (1,7,2,3) code is that it requires a voltage-controlled oscillator operating at a frequency three times that of the data transfer rate. For data transfer rates of the order of 36 MHz, the VCO clock is required to operate at 108 MHz. Stability and reliable self-synchronization of such codes operating at frequencies of the order of 108 MHz is difficult and costly. For example, Cohn requires clock signals at the VCO frequency, and at $\frac{1}{2}$, $\frac{1}{3}$, and 1/6 that frequency to operate the code converter. The data transfer rate, which is $\frac{1}{3}$ the VCO frequency in the Cohn et al circuit, is limited by the frequency limitations of the voltage-controlled oscillator.

In principle, LC clock generators can operate at frequencies in excess of 100 MHz. However, the values of the LC components would be so small as compared to the parasitic elements that each VCO would require individual tuning and its frequency would vary with small environmental changes. In addition, such VCOs would exhibit extraordinary problems due to radiation, electromagnetic interference and screening requirements. Multivibrator-based VCOs, such as used in computer applications (such as Cohn and the present invention) are not susceptible to the problems of LC-based VCOs, but multivibrator-based VCOs are not capable of operating in excess of about 100 MHz using present technologies.

It is an object of the present invention to provide an encoding system for 1,7,2,3 codes wherein the VCO frequency is used directly as the encoded data clock frequency.

Another object of the present invention is to provide a system for derivation of the source data clock and data partition clock required for encoding and decoding 1,7,2,3 codes.

Another object of the present invention is to provide a 3/2 frequency divider, useful for encoding and decoding 1,7,2,3 codes.

In accordance with the present invention, the VCO clock signal is operated at a frequency derived from the media speed (in the case of a write mode) or from the recovered read pulses (in the case of a read mode). From the VCO frequency, two additional frequencies are obtained: a frequency of $\frac{2}{3}$ VCO frequency, which is the source data clock frequency, and a signal at $\frac{1}{3}$ VCO frequency, which is the data partition clock signal. The VCO clock signal, which is also the encoded data clock signal, together with the source data clock signal and data partition clock signal, are provided to the encoder/decoder to encode or decode the 1,7,2,3 code.

One feature of the present invention resides in the provision of a novel 3/2 frequency divider which logically divides the pulse frequency from the VCO by 3/2 to derive the $\frac{2}{3}$ frequency signal for source data clock.

The above and other features of this invention will be more fully understood from the following detailed description, and the accompanying drawings, in which.

Figure 1:
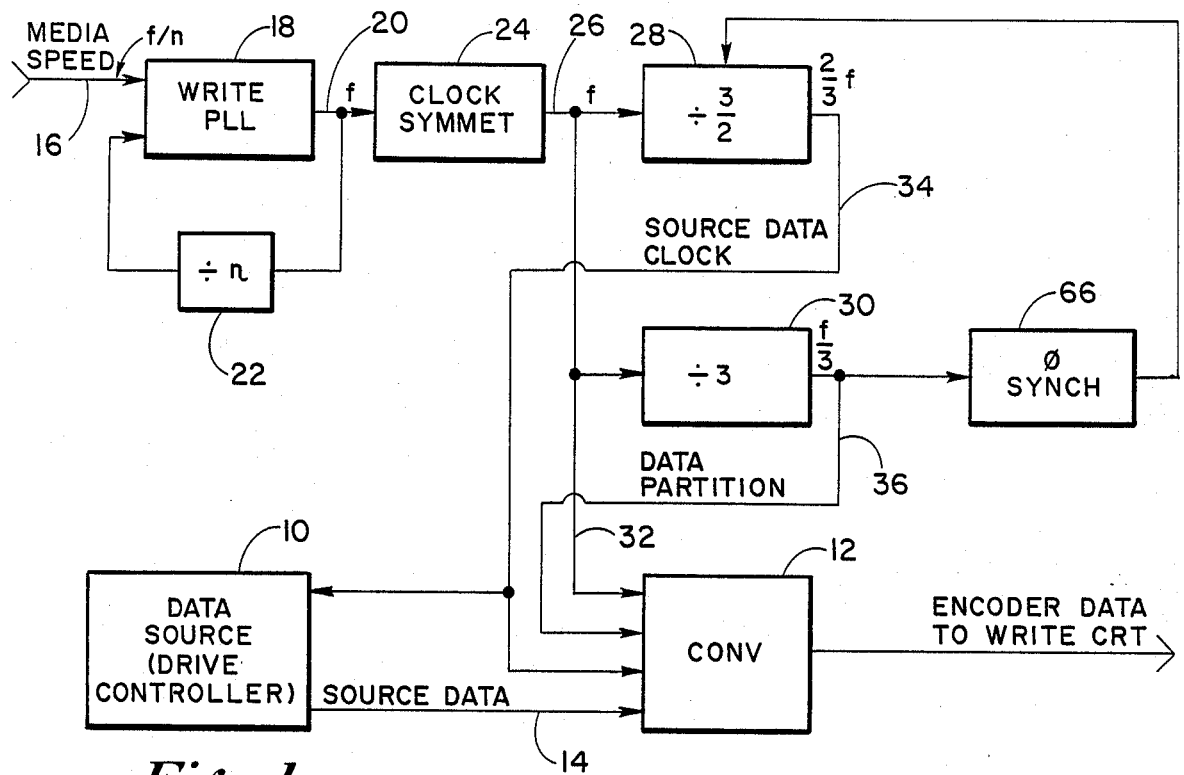
FIG. 1 is a block diagram of a data encoding/decoding system in accordance with the presently preferred embodiment, shown in the data encode or write mode.

Referring to the drawings, and particularly to FIG. 1, there is illustrated apparatus for encoding 1,7,2,3 code for the write circuits to record onto a magnetic disk drive. A data source 10, which may conveniently be the disk drive controller, supplies source data to code converter 12 via channel 14. The source data has a transfer rate equal to 1/T, where T is the time interval of the source data bit cell. Code converter 12 may be, for example, the encoding circuit illustrated in FIG. 1 of the aforementioned Cohn et al patent, the disclosure of which is hereby incorporated by reference. The source data on channel 14 is described as "data in" in the aforementioned Cohn et al patent. A signal representative of the media speed at a frequency of f/n is supplied via channel 16 to write phase lock loop 18 to provide an output on channel 20 at a frequency f. The output on channel 20 is provided through divide by n circuit 22 to the input of write phase lock loop 18 to lock in the frequency f/n of the signal on channel 16. Optionally, clock symmetricizer 24 is provided to provide symmetry to the output signal on channel 26. The signal on channel 26 is at the desired VCO frequency f. This signal is provided as inputs to 3/2 divider 28, divide by 3 circuit 30, and via channel 32 to converter 12. The signal on channel 32 is provided to input 50 of the converter described in the Cohn et al patent.

Divider 28 provides the source data clock signal on channel 34 at a frequency of $\frac{2}{3}$ f. The source data clock period is equal to T. This signal is provided to the data source 10 and to converter 12. Divider 30 provides the data partition clock signal at a frequency of $\frac{1}{3}$ f to converter 12. The data partition clock signal has a period equal to 2T. Referring to FIG. 1 of the Cohn et al patent, the signal on channel 34 is provided to inputs 20 and 23 of Cohn et al, and the signal on channel 36 is provided to mode control inputs 22 and 48 of Cohn et al.

The operation of converter 12 is, essentially, as described in the aforementioned Cohn et al patent, except that the input signals are at the VCO clock frequency f, and at $\frac{2}{3}$ and $\frac{1}{3}$ f, from dividers 28 and 30. In Cohn et al, on the other hand, the clock signals are at $\frac{1}{2}$, $\frac{1}{3}$, and 1/6 the VCO clock frequency. Thus, the present invention permits operation of the Cohn et al circuit at greater data transfer rates than heretofore achievable.

Figure 2:
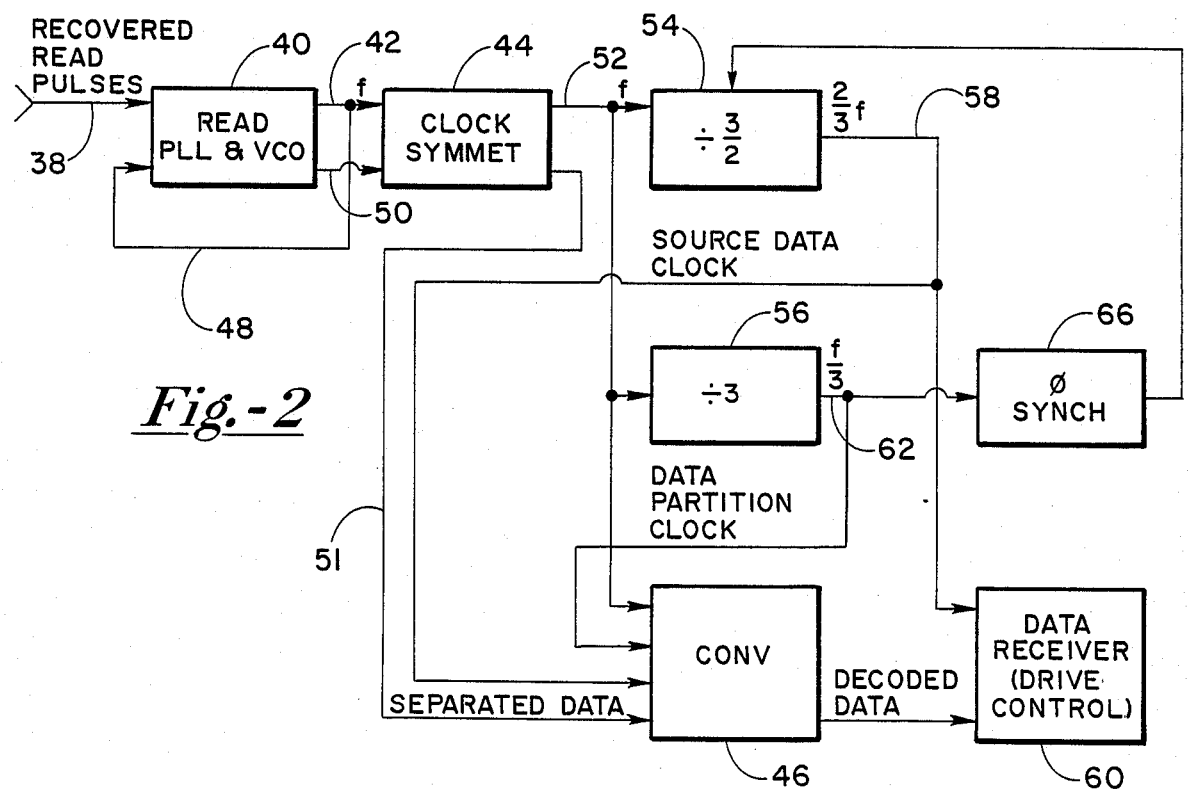
FIG. 2 is a block diagram of the system shown in the data decode read mode.

FIG. 2 illustrates the apparatus in the read mode, wherein recovered read pulses on channel 38 are applied to read phase lock loop and VCO 40, which provides the VCO signal on channel 42 and the separated encoded data on channel 50 to optional clock symmetricizer 44. A feedback loop 48 from channel 42 is provided for the phase lock loop and VCO of unit 40. Optional clock symmetricizer 44 provides a signal of frequency f on channel 52 to 3/2 divider 54 (which may be identical to the 3/2 divider 28 in FIG. 1), to the divide by 3 divider 56 (which may be identical to the divide by 3 divider 30 in FIG. 1.) and as a clock input to code converter 46. Converter 46 is the decoder illustrated at FIG. 2 of the aforementioned Cohn et al patent, with the separated data on channel 51 from clock symmetricizer 44 being the "code in" signal provided to input 60 described in the Cohn et al device. The output of 3/2 divider 54 is taken via channel 58 to converter 46 and to data receiver 60, which may conveniently be the drive controller of the magnetic disk drive. Channel 58 carries the source code clock signal at $\frac{2}{3}$ the VCO frequency and a time interval equal to T. The output of divider 56 is provided via channel 62 to converter 46. Referring to FIG. 2 of Cohn et al, the signal on channel 52 is provided to inputs 64 and 78 described in Cohn et al, the signal on channel 58 in provided to input 88 described in Cohn et al, and the data partition clock signal on channel 62 is provided to input mode control 72, 76, and 86, described in Cohn et al.

Converter 46 operates in the manner as described in the Cohn et al patent, except that the input signals are operated at the VCO clock signal frequency, and at signal frequencies equal to $\frac{2}{3}$ and $\frac{1}{3}$ the VCO clock signal frequency, rather than $\frac{1}{2}$, $\frac{1}{3}$, and 1/6 of the VCO frequency as described in the Cohn et al patent.

The divide-by-three divider 30 (FIG. 1) and 56 (FIG. 2) may be simple count-to-three counter. The 3/2 divider 28 (FIG. 1) and 54 (FIG. 2) is shown in greater detail in FIG. 3.

Figure 3:
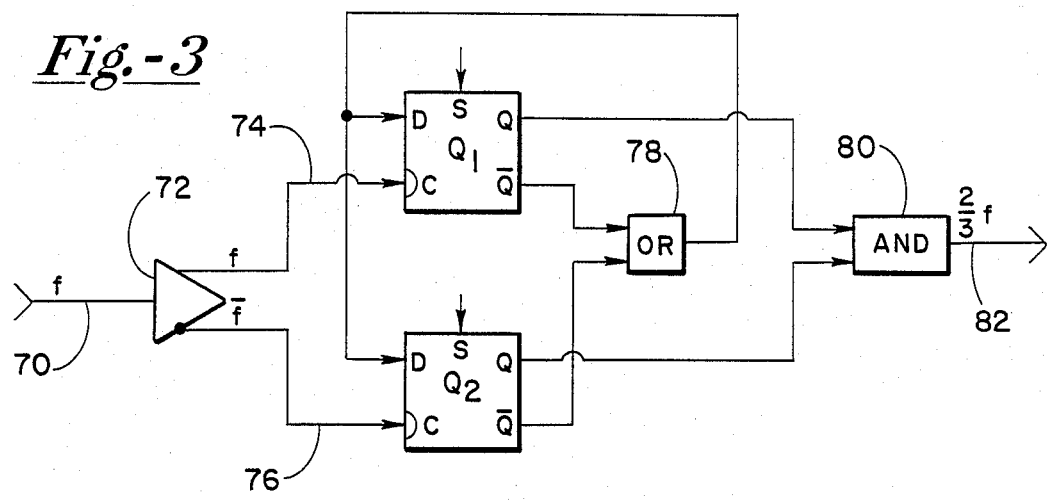
FIG. 3 is a block diagram of a 3/2 frequency divider for use in the circuit illustrated in FIGS. 1 and 2.

Referring to FIG. 3, there is illustrated a block circuit diagram of 3/2 frequency divider for use in the encoder/decoder circuit illustrated in FIGS. 1 and 2. The circuit illustrated in FIG. 3 is useful in place of blocks 28 and 54 in FIGS. 1 and 2. The divider comprises input channel 70 for receiving a signal frequency f. Unit 72 provides separate output complementary signals f and f-not on channels 74 and 76 for input to the clock inputs of D-type flip-flops Q1 and Q2. The Q-not outputs of flip-flops Q1 and Q2 are provided as separate inputs to OR gate 78 for input to the D inputs of both flip-flops Q1 and Q2. The Q outputs of flip-flops Q1 and Q2 are provided as separate inputs to AND gate 80, whose output on channel 82 is the $\frac{2}{3}$ frequency signal for input to converters 12 and 46, data source 10 and data receiver 60 in FIGS. 1 and 2.

Figure 4:
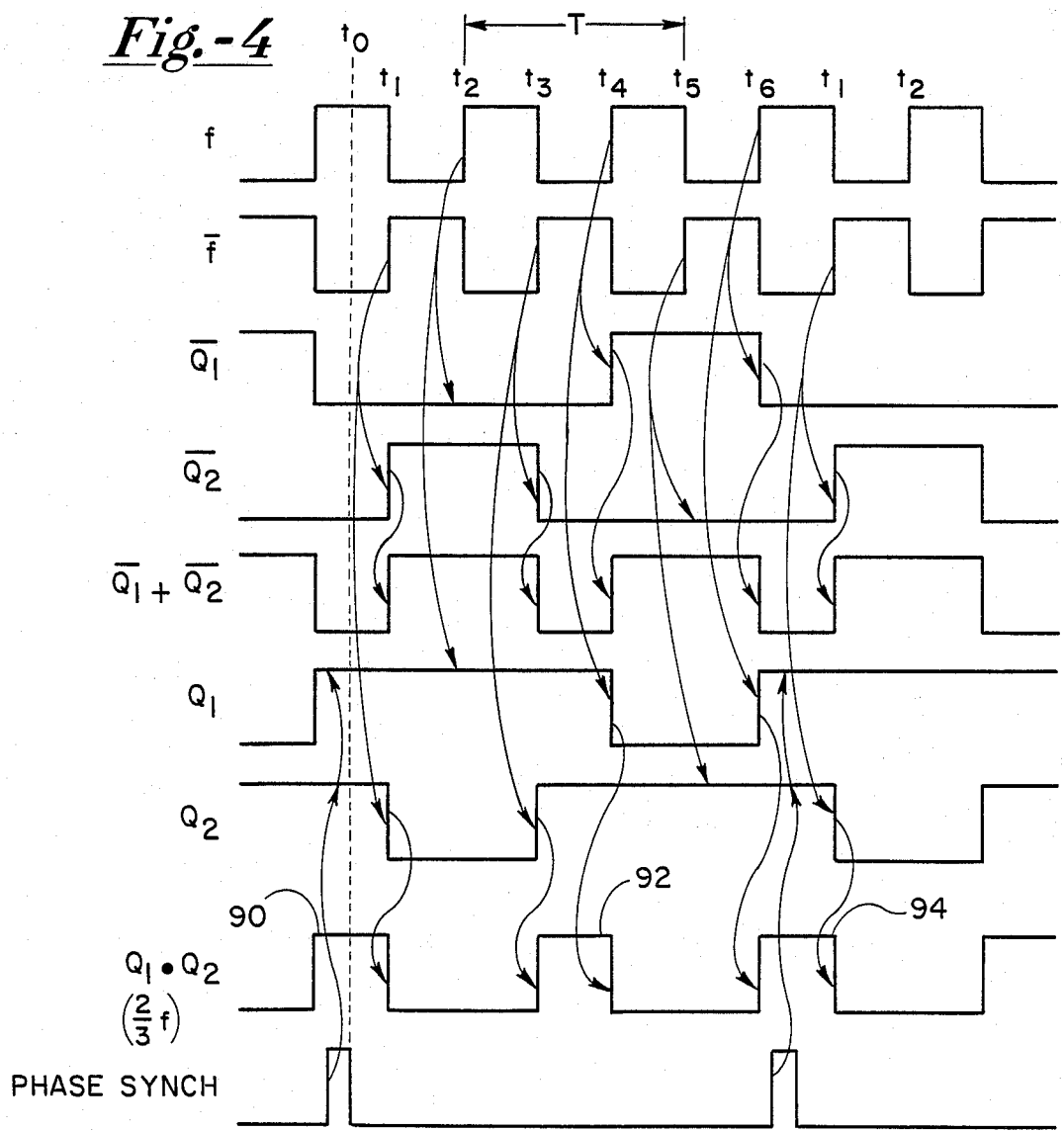
FIG. 4 is a set of waveforms illustrating operation of the 3/2 frequency divider illustrated in FIG. 3.

Referring to FIG. 4, the operation of the divider circuit illustraed in FIG. 3 may be explained. Starting at time $t_0$, the Q outputs of both Q1 and Q2 are high and the Q-not outputs of both are low. In this condition, with both Q1 and Q2 outputs high, the output pulse 90 from AND gate 80 is provided on channel 82, and the output of OR gate 78 is low. At time $t_1$, the f-not signal to the clock input of flip-flop Q2 goes high, thereby resetting flip-flop Q2 so that Q-not output of flip-flop Q2 goes high, the Q output of flip-flop Q2 goes low, and the output of OR gate goes high. As a result, the signal on channel 82 goes low. At time $t_2$, the leading edge of pulse signal f is applied to the clock input of flip-flop Q1. However, since the high level from OR gate 78 is applied to the D input of flip-flop Q1 and the flip-flop is already in a high state, there is no effect on flip-flop Q1. At time $t_3$, the leading edge of f-not is applied to the clock input of flip-flop Q2, thereby resetting flip-flop Q2 (due to the previously high state of its D input), thereby setting the Q2 output signal high and Q-not output of flip-flop Q2 low. With the Q-not output of Q2 low, the output of OR gate 78 goes low to the D inputs. With Q output of flip-flop Q2 high, the leading edge of pulse 92 is formed from AND gate 80. At time $t_4$, the leading edge of pulse f applied to the clock input of flip-flop Q1. Due to the low state of the D input of flip-flop Q1, flip-flop Q1 is reset low, thereby terminating pulse 92. The Q-not output of flip-flop Q1 is set high, thereby setting the output of OR gate 78 high to provide high D inputs to both flip-flops. At time $t_5$, the leading edge of f-not applied to the clock input of flip-flop Q2 has no effect on the flip-flop Q2 due to the high D input at flip-flop Q2. As a result, the Q output of flip-flop Q2 remains high and the Q-not output of flip-flop Q2 remains low. At time $t_6$, the leading edge of pulse f operates to set flip-flop Q1 (due to the previously high state of the D input) to thereby establish the leading edge of pulse 94. Also, the Q-not output of flip-flop Q1 is terminated, thereby terminating the output from OR gate 78, thereby establishing the conditions at the $t_0$ line illustrated in FIG. 4.

Preferably, phase synchronizer 66 (FIGS. 1 and 2) is provided at the outputs of the divide-by-three divider 30 (FIG. 1) and 56 (FIG. 2) to provide short synchronizing pulses (synch pulses, in FIG. 4) to the overriding set input (S) of flip-flops Q1 and Q2. As shown in FIG. 4, the synchronizing pulses normally occur (at a frequency of $\frac{1}{3}$T or f/3) when both flip-flops Q1 and Q2 are already in their high states. Therefore, the synchronizing pulses do not disturb the synchronous action of the 3/2 divider. The synchronizing pulses serve to establish the initial phase relation of the source data clock signal (from 3/2 divider) with the data partition clock signal from the divide-by-three divider. The synchronizing pulses also serve to maintain the correct phase relation.

The present invention thus provides an effective recovery system for utilizing 1,7,2,3 code, which does not require the high frequency VCO required by previous systems. The result, the system is more effective in operation and makes greater use of the advantages of the code than over previous systems. The present invention also provides a novel 2/3 frequency divider.

One feature of the present invention resides in the fact that the data transfer rate is at the clock period T which is at a frequency of $\frac{2}{3}$ f. For a data transfer frequency of 36 MHz, a VCO frequency of 54 MHz is required, rather than a 108 MHz VCO required by Cohn for the same data transfer frequency. As a result, greater reliability and simplicity of design over Cohn's approach is achieved.

This invention is not to be limited by the embodiments shown in the drawings and described in the description, which are given by way of example and not of limitation, but only in accordance with the scope of the appended claims.

What is claimed is:

1. Apparatus for encoding or decoding data in a 1,7,2,3 code with a data transfer rate of 1/T, where T is the time interval of a source data bit cell, said apparatus comprising oscillator means responsive to the speed of a recording media on which encoded data is to be recorded to produce a media speed signal having a frequency f, or responsive to data to be decoded recovered from a recording media to produce a read signal having a frequency f; first divider means responsive to the signal produced by said oscillator means for producing a source data clock signal having a frequency equal to $\frac{2}{3}$ f and a clock period equal to T; second divider means responsive to the signal produced by said oscillator means for producing a data partition clock signal having a frequency equal to $\frac{1}{3}$ f and a clock period equal to 2T; converter means responsive to a source data signal and to said media speed signal and to said data partition clock signal and to said source data clock signal to encode said source data in 1,7,2,3 code, or responsive to separated data recovered from said media and to said read signal and to said data partition clock signal and to said source data clock signal to decode said separated data from 1,7,2,3 code; and phase synchronization means responsive to said data partition clock signal to synchronize operation of said first divide means.

2. Apparatus for encoding or decoding data in a 1,7,2,3 code with a data transfer rate of 1/T, where T is the time interval of a source data bit cell, said apparatus comprising oscillator means responsive to the speed of a recording media on which encoded data is to be recorded to produce a media speed signal having a frequency f, or responsive to data to be decoded recovered from a recording media to produce a read signal having a frequency f; first divider means responsive to the signal produced by said oscillator means for producing a source data clock signal having a frequency equal to $\frac{2}{3}$ f and a clock period equal to T, said first divider means comprising a first D-type flip-flop having D and clock inputs and Q and Q-not outputs, a second D-type flip-flop having D and clock inputs and Q and Q-not outputs, means responsive to the signal produced by said oscillator means for providing the signal from the oscillator means to the clock input of said first D-type flip-flop and for providing the inverse of the signal from the oscillator means to the clock input of said second D-type flip-flop, first logic means responsive to the Q-not outputs of said first and second D-type flip-flops for providing a signal of a first state to the D inputs of said first and second D-type flip-flops when the Q-not output of either of said D-type flip-flops is in said first state, and for providing a signal of a second state to the D inputs of said first and second D-type flip-flops when the Q-not outputs of both said first and second D-type flip-flops are in said second state, said first state being opposite said second state, and second logic means responsive to the Q outputs of said first and second D-type flip-flops to provide said source data clock signal; second divider means responsive to the signal produced by said oscillator means for producing a data partition clock signal having a frequency equal to $\frac{1}{3}$ f and a clock period equal to 2T; and converter means responsive to a source data signal and to said media speed signal and to said data partition clock signal and to said source data clock signal to encode said source data in 1,7,2,3 code, or responsive to separated data recovered from said media and to said read signal and to said data partition clock signal and to said source data clock signal to decode said separated data from 1,7,2,3 code.

3. Apparatus according to claim 2 wherein said first and second D-type flip-flops each further has a set input, said apparatus further including phase synchronization means responsive to said data partition clock signal to provide synchronization signal to the set inputs of said first and second D-type flip-flops.

4. Apparatus according to claim 3 wherein said first logic means is an OR gate and said second logic means is an AND gate.

5. Apparatus according to claim 2 wherein said first logic means is an OR gate and said second logic means is an AND gate.

* * * * *